United States Patent [19]

Nicholson

[11] Patent Number: 4,781,842

[45] Date of Patent: Nov. 1, 1988

[54] METHOD OF TREATING WASTEWATER SLUDGE

[75] Inventor: John P. Nicholson, Toledo, Ohio

[73] Assignee: N-Viro Energy Systems Ltd., Toledo, Ohio

[21] Appl. No.: 19,888

[22] Filed: Feb. 27, 1987

[51] Int. Cl.$^4$ .............................................. C02F 11/14
[52] U.S. Cl. .................... 210/751; 210/764; 210/916; 71/13
[58] Field of Search .............. 210/751, 764, 758, 770, 210/916; 71/13

[56] References Cited

U.S. PATENT DOCUMENTS

| | | |
|---|---|---|
| 3,915,853 | 10/1975 | Luck ............................... 210/764 X |
| 3,960,718 | 6/1976 | Lebo .................................... 210/758 |
| 4,124,405 | 11/1978 | Quienot ........................... 210/751 X |
| 4,230,568 | 10/1980 | Chappell ............................ 210/751 |
| 4,514,307 | 4/1985 | Chestnut et al. .................... 210/751 |
| 4,541,986 | 9/1985 | Schwab et al. ................. 210/764 X |

Primary Examiner—Tom Wyse
Attorney, Agent, or Firm—Barnes, Kisselle, Raisch, Choate, Whittemore & Hulbert

[57] ABSTRACT

A method of decontaminating wastewater sludge to a level that meets or exceeds USEPA Process to Further Reduce Pathogens standards, wherein lime or kiln dust and/or other alkaline materials are mixed with wastewater sludge in sufficient quantity to raise the pH of the mixture to 12 and above for at least two hours and drying the resulting mixture by an aeration process.

9 Claims, 10 Drawing Sheets

FIG. 7

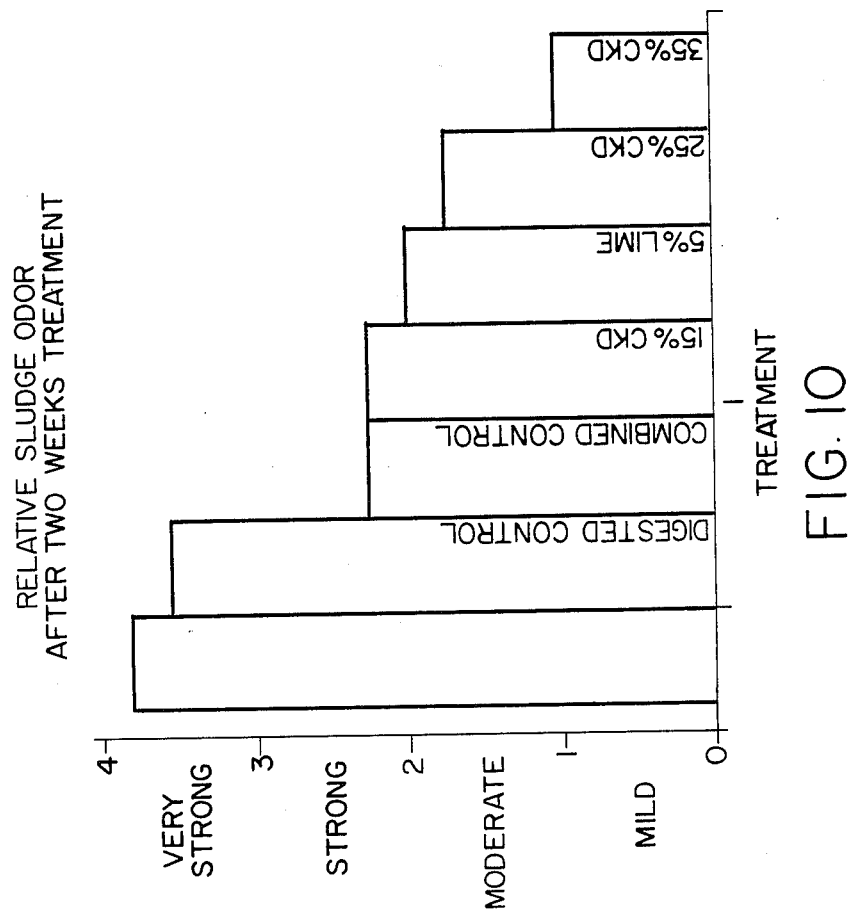

METHOD OF TREATING WASTEWATER SLUDGE

This invention relates to a method of treating wastewater sludge designed to decontaminate the sludge so that it can be safely applied as fertilizer to agricultural lands.

BACKGROUND OF THE INVENTION

Romans used lime to disinfect and deodorize human waste. The use has continued throughout the development of civilization. However, prior to this invention, the use of lime for wastewater sludge treatment has been severely limited by governmental regulations including the United States Environmental Protection Agency (EPA).

The EPA has promulgated rules governing the type of processes that can be used to treat wastewater sludge.

Under 40 CFR 257, a Process to Further Reduce Pathogens (PFRP) (See p. 5, 6) must be used where sewage sludge or septic tank pumpings are to be applied to a land surface or are incorporated into the soil, and crops for direct human consumption are to be grown on such land within eighteen (18) months subsequent to application or incorporation.

A Process to Significantly Reduce Pathogens (PSRP) (See p. 5) must be used where sewage sludge or septic tank pumpings are to be applied to a land surface or incorporated into the soil and the public will have access to such land within twelve (12) months subsequent to application or incorporation, or grazing animals, whose products are consumed by humans, will have access to such land within one (1) month subsequent to application or incorporation.

Appendix II of 40 CFR 257 classifies the following as PSRP and PFRP processes:

A. Processes to Significantly Reduce Pathogens

Aerobic digestion: The process is conducted by agitating sludge with air or oxygen to maintain aerobic conditions at residence times ranging from 60 days at 15° C. to 40 days at 20° C., with a volatile solids reduction of at least 38 percent.

Air Drying: Liquid sludge is allowed to drain and/or dry on under-drained sand beds, or paved or unpaved basins in which the sludge is at a depth of nine inches. A minimum of three months is needed, two months of which temperatures average on a daily basis above 0° C.

Anaerobic digestion: The process is conducted in the absence of air at residence times ranging from 60 days at 20° C. to 15 days at 35° to 55° C., with a volatile solids reduction of at least 38 percent.

Composting: Using the within-vessel, static aerated pile or windrow composting methods, the solid waste is maintained at minimum operating conditions of 40° C. for 5 days. For four hours during this period the temperature exceeds 55° C.

Lime Stabilization: Sufficient lime is added to produce a pH of 12 after 2 hours of contact.

Other methods: Other methods or operating conditions may be acceptable if pathogens and vector attraction of the waste (volatile solids) are reduced to an extent equivalent to the reduction achieved by any of the above methods.

B. Process to Further Reduce Pathogens

Composting: Using the within-vessel composting method, the solid waste is maintained at operating conditions of 55° C. or greater for three days. Using the static aerated pile composting method, the solid waste is maintained at operating conditions of 55° C. or greater for three days. Using the windrow composting method, the solid waste attains a temperature of 55° C. or greater for at least 15 days during the composting period. Also, during the high temperature period, there will be a minimum of five turnings of the windrow.

Heat drying: Dewatered sludge cake is dried by direct or indirect contact with hot gases, and moisture content is reduced to 10 percent or lower. Sludge particles reach temperatures well in excess of 80° C., or the wet bulb temperature of the gas stream in contact with the sludge at the point where it leaves the dryer is in excess of 80° C.

Heat treatment: Liquid sludge is heated to temperatures of 180° C. for 30 minutes.

Thermophilic Aerobic Digestion: Liquid sludge is agitated with air or oxygen to maintain aerobic conditions at residence times of 10 days at 55°–60° C., with a volatile solids reduction of at least 38 percent.

Other methods: Other methods of operating conditions may be acceptable if pathogens and vector attraction of the waste (volatile solids) are reduced to an extent equivalent to the reduction achieved by any of the above methods.

Any of the processes listed below, if added to the processes described in Section A above, further reduce pathogens. Because the processes listed below, on their own, do not reduce the attraction of disease vectors, they are only add-on in nature.

Beta ray irradiation: Sludge is irradiated with beta rays from an accelerator at dosages of at least 1.0 megarad at room temperature (ca. 20° C.).

Gamma ray irradiations: Sludge is irradiated with gamma rays from certain isotopes, such as $^{60}$Cobalt and $^{137}$Cesium, at dosages of at least 1.0 megarad at room temperature (ca. 20° C.).

Pasteurization: Sludge is maintained for at least 30 minutes at a minimum temperatures of 70° C.

Other methods: Other methods of operating conditions may be acceptable if pathogens are reduced to an extent equivalent to the reduction achieved by any of the above add-on methods.

Prior to this invention, many concerns have been raised about the long term disinfection and stabilization capability of the treatment. Farrel et al, in "Lime Stabilization of Primary Sludges", Journal of Water Pollution Control Fed 46, 113 January 1974 published by USEPA, states: "Lime stabilization does not make the sludges chemically stable. The pH eventually falls and surviving bacteria may return if conditions are favorable . . . higher organisms such as Ascaris survive short term exposure to pH of 11.5 and possibly long term exposure."

In January 1979, the EPA published a Wastewater Sludge Manual (EPA 625/1-79-001) titled "Process Design Manual for Sludge Treatment and Disposal" which states:

"Lime stabilization is a very simple process. Its principal advantages over other stabilization processes are low cost and simplicity of operation . . . lime addition does not make sludge chemically stable; if pH drops below 11.0, biological decomposition will resume producing noxious odors. Second, the quantity of sludge for disposal is not reduced, as it is by biological stabilization methods. On the contrary, the mass of dry sludge is increased by the lime added and by the chemical precipitates that derive from the addition. Thus because of the increased volume, the costs of transport and ultimate disposal are often greater for lime stabilized sludges than for sludge stabilized by other methods . . . quantitative observation under a microscope has shown substantial survival of higher organisms, such as hook worms, amoebic systs and Ascaris ova after contact time of 24 hours at high pH."

Reimers, Englande et al (EPA 600/2-81-166) reported that:

"Application of lime to primary aerobic digested and anaerobic digested sludge was found to be effective with greater than 80% reduction of Ascaris viability in 5 days following aerobic digestion at a lime dosage of about 1000 mg/gram of sludge solids (one part lime to one part sludge solids) . . . In the case of the 35° C. aerobically-digested sludge, there was no apparent effect of lime on the viability of Ascaris eggs at dosages up to 3000 mg of lime per gram of dry sludge solids under anaerobic conditions, in the period of 20 days. However, under aerobic conditions, a 98% reduction of viable Ascaris eggs were observed within one hour at dosages greater than 1000 mg of lime per gram of dry sludge solids, but only 77% reduction of the viable eggs was observed at a dosage of 100 mg lime per gram of dry sludge solids after 20 days. The explanation of these differentials is not apparent."

In July 1984, the Sandia National Laboratories published a report titled "Pathogens in Sludge Occurrence, Inactivation and Potential for Regrowth" which states:

"To summarize the effects of lime on sludge pathogens viruses are destroyed by high pH values, although it has not been shown that viruses within sludge itself are inactivated; parasite ova are resistant to high pH, and most will probably survive lime treatment; bacteria are rapidly inactivated at pH 12 but, because of pH decreases at levels suitable for bacteria growth, their numbers increase with time."

In October 1984, the EPA published a report (EPA 625/10-84-003) titled "Use and Disposal of Municipal Wastewater Sludge" which was the basis for future regulations. Section 3 of the report states:

"If crops for direct human consumption are grown within 18 months of sludge application, sludge must be treated with a PFRP. These processes destroy pathogenic bacteria, viruses and protozoa as well as parasites in most cases by exposing the sludge to elevated temperatures over a period of time."

On Nov. 6, 1985 the EPA issued a memorandum regarding applicaton of 40 CFR 257 regulations to pathogen reduction preceding land application of sewage sludge or septic tank pumpings. One of the purposes of issuing the memorandum was to outline procedures to enable enforcement agents to determine whether sprocesses other than those listed in the regulation (40 CFR 257) qualify as a PFRP process. To qualify a process as a PSRP, one must demonstrate that the process reduces animal viruses by one log and pathogenic bacterial densities by at least two logs and must reduce the vector attractiveness such that vectors, like flies or rats, are not attracted to the sludge. To qualify a new process as PFRP, one must demonstrate reduction of pathogenic bacteria, animal viruses, and parasites "below detectable limits" of one (1) plaque forming unit (PFU) per 100 ml of sludge for animal viruses; three (3) colony forming units (CFU) per 100 ml of sludge for pathogenic bacteria (Salmonella sp.); and one (1) viable egg per 100 ml of sludge for parasites (Ascaris sp.). Vector attractiveness must also be reduced for PFRP.

If only PSRP disinfective is utilized, land application for fertilization purposes is controlled by EPA restrictions (it cannot be used on root crop: "40 CFR 257"). If the process achieved PFRP criteria these restrictions are eliminated ("40 CFR 257").

In my U.S. Pat. No. 4,554,002, it was shown that kiln dust could be used to reduce pathogens and dry wastewater sludge prior to land application.

Roediger, U.S. Pat. No. 4,270,279, describes a method of drying and sterilizing sewage sludge wherein sheet-like sewage sludge is broken up into ball-like sludge particles and dusting the outer surface only with quicklime. This technology utilizes exothermic heat generated from the reaction of adding $H_2O$ to quick lime to sterilize the sludge. This heat sterilization is typical to the traditional aforementioned PFRP processes. To this date, the EPA has not approved a petition for approval of this technology as a PSRP process. Moreover, there are problems with this method. If this method actually sterilizes the sludge, it would kill all life forms contained in the sludge, whether they were pathogenic or beneficial non-pathogenic microorganisms. In contrast, the present invention decontaminates sludge, killing pathogens to a level below PFRP standards but does niot eliminate all non-pathogenic microorganisms from the sludge.

None of the above references suggest that lime or kiln dust, in combination with a natural drying process, could be used to produce the pathogenic reduction in wastewater sludge equivalent to PFRP processes, and thus provide an inexpensive method of treating wastewater sludge such that it can be applied directly to land as a fertilizer to grow crops for direct human consumption.

SUMMARY OF THE INVENTION

In accordance with the invention, lime, cement kiln dust or lime kiln dust or mixtures thereof and/or other alkaline materials are mixed with wastewater sludge in sufficient quantity to raise the pH to 12 and above for at least two hours and the resulting mixture is dried by an aeration process. The process produces a product wherein the pathogen viability has been reduced to a level that meets or exceeds USEPA criteria for PFRP processes.

BRIEF DESCRIPTION OF THE DRAWINGS

FIG. 7 is a bar chart of the log number of enterovirus per weight of sludge versus days of treatment.

FIG. 10 is a bar chart of the relative sludge odor after two weeks of treatment.

DESCRIPTION

Figure 1:
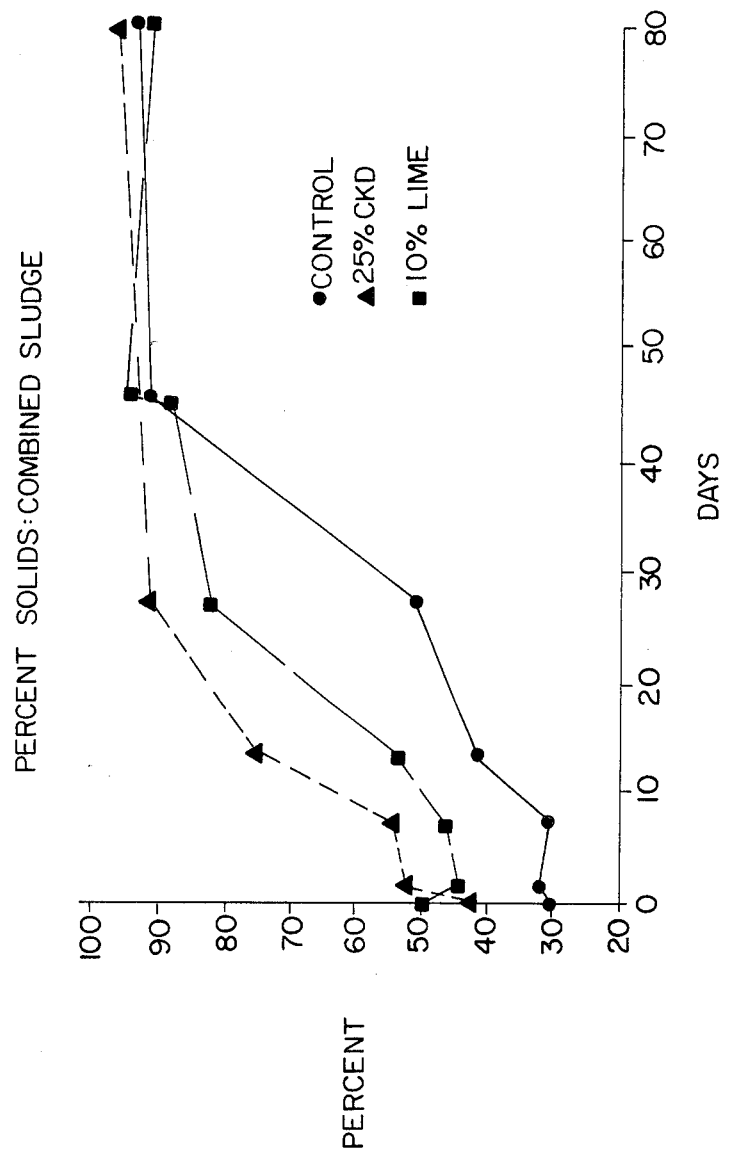
FIG. 1 are curves of the percent solids of sludge versus days of treatment.

Basically, the process of this invention comprises mechanically dewatering the sludge; chemical stabilizing of the wastewater sludge with quantities of lime, cement kiln dust or lime kiln dust or mixtures thereof sufficient to maintain a pH of 12 and above for at least two hours and preferably for days; and then drying the sludge by an aeration process such as a Brown Bear aerating device. To achieve PFRP pathogen reduction criteria, the treated sludge is aerated such that the sludge is at least eighty percent (80%) by weight solids and preferably ninety percent (90%) by weight solids. The product is allowed to air cure for about 10 days after desired solids content is achieved. The drying and curing of the mixture may also be accomplished by a windrow method, turn-over method, or other forced air methods. The curing time or aeration time is dependent on the type of storage facility (cover, enclosed, or open), aeration procedure, mix design, physical and chemical properties of the admixtures, quality of the mixing facilities, percent solids of dewatering cake, and type of sludge. The chemical stabilizing admixture can be added after mechanical dewatering, if desired. Lime, cement kiln dust and lime kiln dust are excellent flocculents and thus can be useful in conditioning prior to mechanical dewatering with most equipment.

The range of lime, cement kiln dust or lime kiln dust mixed with the sludge is about ten percent (10%) by weight to 200% by weight of the dry sludge depending on the variables listed above.

The addition of high reactant-heat generating materials or heating the sludge and materials may be used to reduce the total amount of admixture required and/or reduce the curing time required. Addition of anhydrous ammonia and either phosphoric acid or sulphuric acid to chemical stabilized sludge, having a pH of 12 and above, produces sufficient heat to help reduce pathogens to a level equivalent to PFRP processes and at the same time increases the nutritional value of the sludge while reducing curing time and natural drying requirements. In addition to chemical generated heat, mechanical or electrical heat may be applied to dry and cure the mixture.

The solid waste generated by cement manufacture is primarily kiln dust. This dust contains a mixture of raw kiln feed, partly calcined material, finely divided cement clinker and alkaline and alkali carbonates and sulfates (usually sulfates). There is economic value in returning the dust to the kiln, but when the alkali content of the returned dust is too high for the product clinker to meet specifications, the dust must be discarded. Up to about 15% of the raw materials processed may be collected as dust and of this about half may be low enough in alkalis to be returned to the kiln. The rest usually stockpiled as a waste material which usually is discarded and may be a nuisance and possibly a hazard.

Typically, the major oxides found in a cement kiln dust are: $SiO_2$, $Al_2O_3$, $Fe_2O_3$, CaO, MgO, $So_3$, $Na_2O$ and $K_2O$.

The solid waste generated by lime manufacture is primarily lime stack dust. This dust contains a mixture of raw kiln feed, partly calcined material, and finely divided material. There is no value in returning the dust to the kiln, as it is too fine and passes directly through to the precipitator again. Up to about 15% of the raw materials processed may be collected as dust. It is usually stockpiled as a waste material which usually is discarded and may be a nuisance and possibly a hazard.

Typically, the major oxides found in lime stack dust are: CaO, MgO, $SO_3$, $CO_2$ and Available Free Lime.

A combination of materials may be used to provide the most economical system such as using lime, cement kiln dust or lime kiln dust or mixtures thereof to achieve chemical stabilization, and adding bulking material such as slag fines, fly ash, gypsum, fluidized bed residue, dry sulphuur scrubber residue, calcium sulphate fines, and the like, to assist in dewatering. Lime, cement kiln dust or lime kiln dust alone cannot achieve the desired results of reducing pathogens to PFRP levels, but when used in combination with a drying process, the decontamination can achieve PFRP levels.

The process will drastically reduce the odor of the sludge, even though the pH may drop below 9 during the curing period and the use of admixtures as bulking agents reduces the volume of the sludge for disposal or utilization.

In a test, the use of cement kiln dust (CKD) and lime to stabilize and disinfect sludge from the Toledo municipal wastewater treatment plant was studied.

Specifically, tests were conducted to determine whether the processes embodying this invention met requirements to be classified as a Process to Significantly Reduce Pathogens (PSRP) and a Process to Further Reduce Pathogens (PFRP). As indicated above, for PSRP classification, the fecal and total coliform bacterial counts must be reduced by two logs and the animal virus count must be reduced by one log. For PFRP classification, animal viruses must be less than one (1) plaque forming unit (PFU) per 100 ml of sludge; pathogenic bacteria (Salmonella) must be less than three (3) colony forming units (CFU) per 100 ml of sludge; and parasites (helmonth eggs—Ascaris) must be less than one (1) viable egg per 100 ml of sludge, wherein 100 ml of sludge is equivalent to about five (5) gms of dry solids. (As indicated in EPA Memorandum of Nov. 6, 1985).

FIG. 1, comprises a curve of the percent solids of combined sludge versus days of treatment, without any added materials, with twenty-five percent (25%) by weight cement kiln dust (CKD), and with ten percent (10%) by weight lime.

As illustrated by FIG. 1, the addition of either ten percent (10%) by weight of lime or twenty-five percent (25%) by weight of cement kiln dust (CKD) enhanced the drying rate of sludges, particularly in the first four weeks of treatment. Combined sludge is a mixture of primary sludge and secondary (waste activated) sludge.

Figure 2:
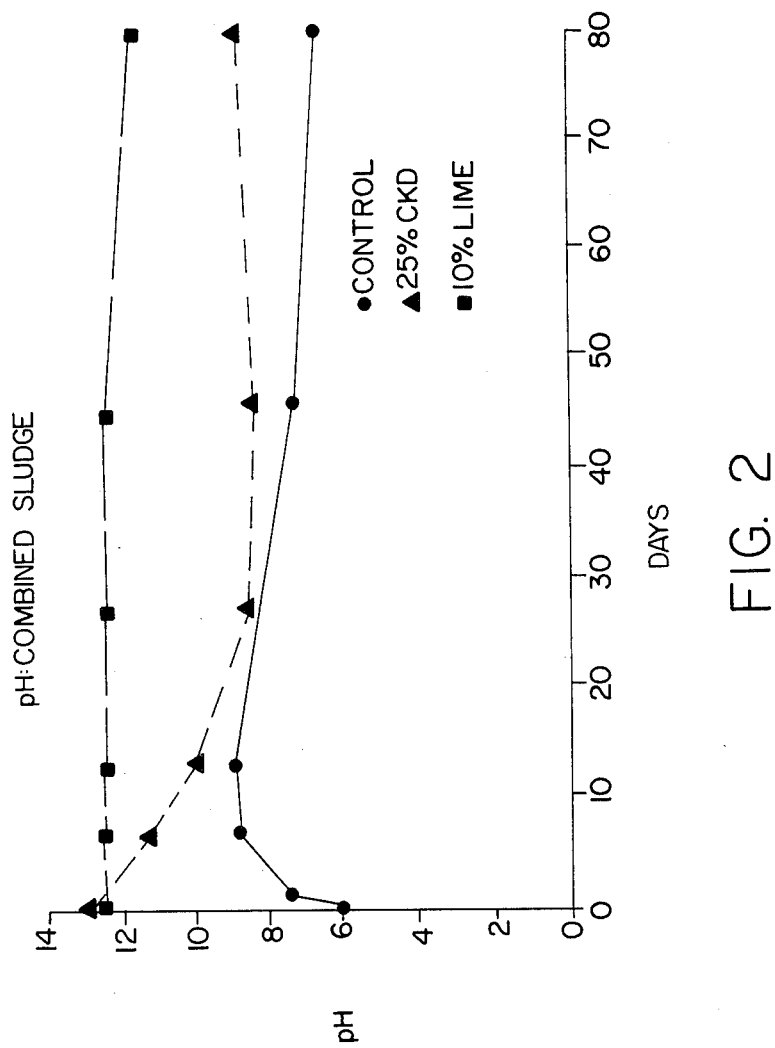
FIG. 2 are curves of the pH of sludge versus days of treatment.

FIG. 2, comprises a curve of pH of combined sludge versus days of treatment, without any added materials, with twenty-five percent (25%) by weight cement kiln dust (CKD), and with ten percent (10%) by weight lime.

FIG. 2, shows that the pH of ten percent (10%) by weight lime treated sludge did not decline appreciably during the study and that twenty-five percent (25%) by weight cement kiln dust treated sludge maintained at pH level of 12.4 for one (1) day before slowly declining and and reading control levels in about four weeks.

Figure 3:
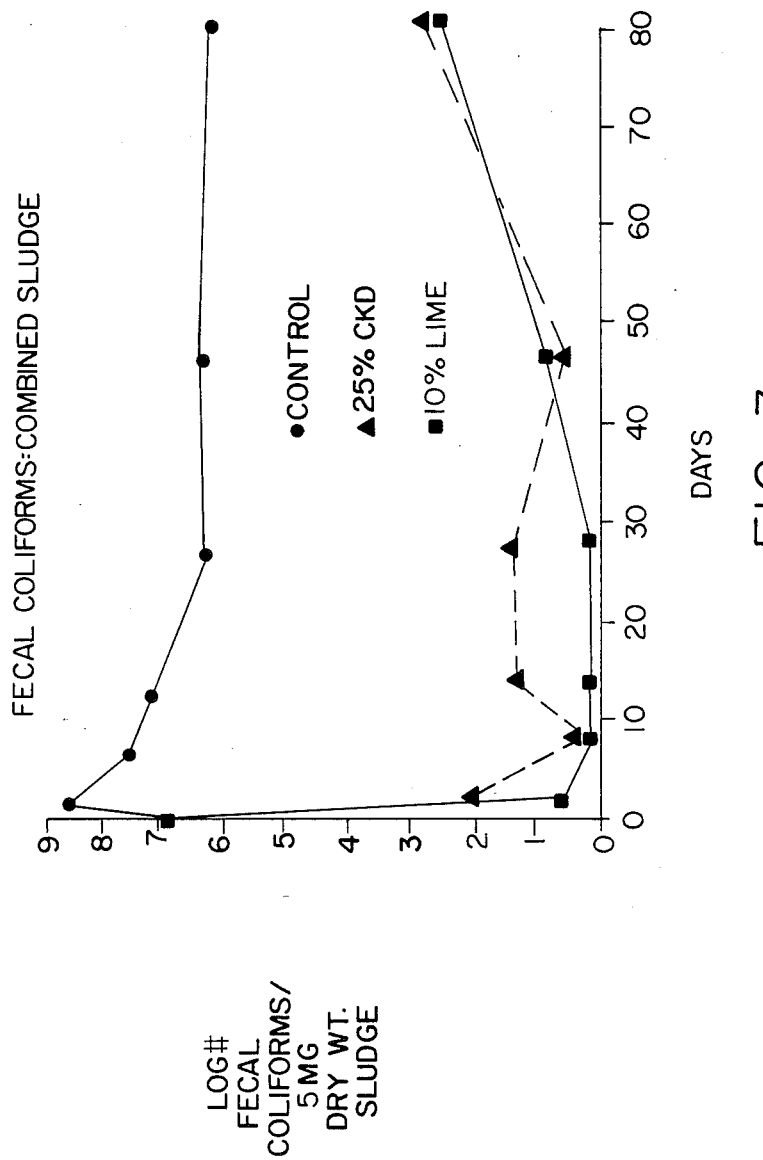
FIG. 3 are curves of the log number of fecal coliform per weight of sludge versus days of treatment.

FIG. 3, comprises a curve of the log number of fecal coliform per weight of combined sludge versus days of treatment, without any added materials, with twenty-five percent (25%) by weight cement kiln dust (CKD), and ten percent (10%) by weight lime.

FIG. 3, shows that fecal coliforms, one of the most common types of indicator bacteria used for water quality assays, were unaffected in untreated sludge regardless of the amount of drying. However, the sludge treated with twenty-five percent (25%) by weight cement kiln dust showed a rapid five (5) log reduction in coliforms in one (1) day and dropped even further in one week to one (1) bacterium per five (5) gms dry weight of sludge. The sludge treated with ten percent (10%) be weight lime treated sludge experienced a six (6) log reduction in coliforms in the first day. Some regrowth was found in both lime and cement kiln dust treated sludge with the final population measured at 500 bacteria/5 gm dry at sludge.

Figure 4:
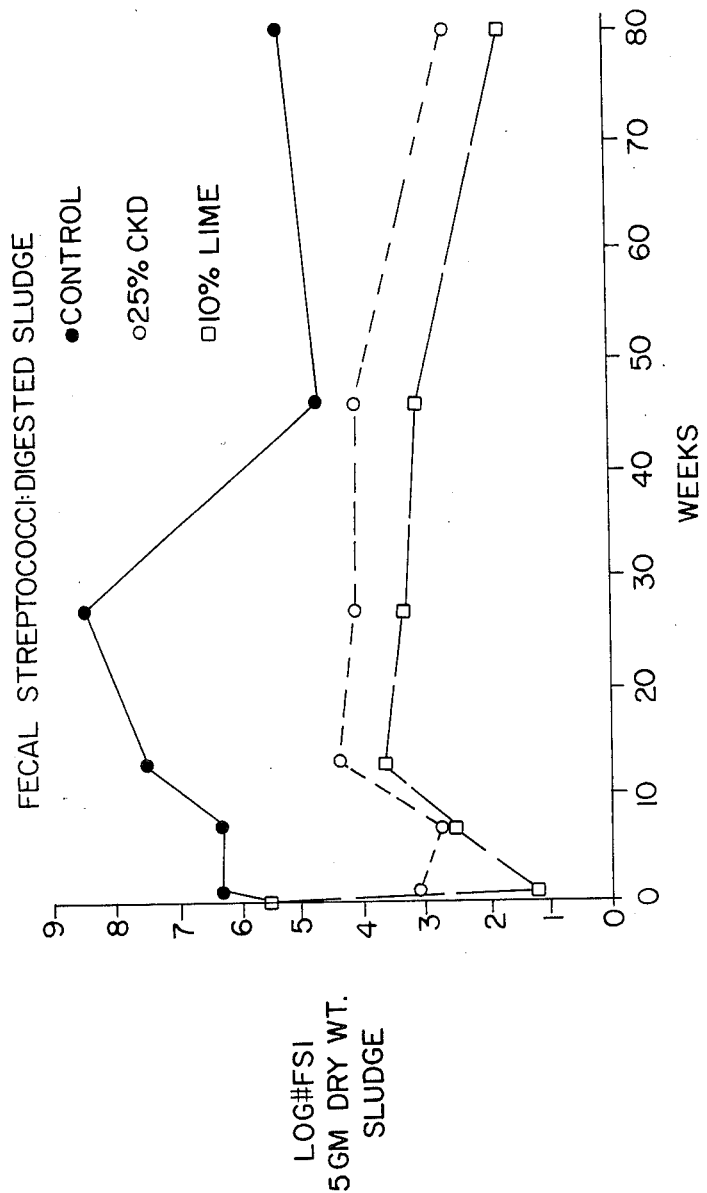
FIG. 4 are curves of the log number of fecal streptococci per weight of sludge versus days of treatment.

FIG. 4, comprises a curve of the log number of fecal streptococci per weight of digested sludge versus days of treatment, without any added materials, with twenty-five percent (25%) by weight cement kiln dust (CKD), and ten percent (10%) by weight lime.

FIG. 4 illustrates that the fecal streptococci decreased in both the lime and cement kiln dust treated samples by over two logs but did not decline any further over the course of the study. The significance of this observation is that the cement kiln dust and lime did not possess an inherent toxicity sufficient to kill all microorganisms and that the killing process selected out only certain microbial populations such as Salmonella.

Figure 5:
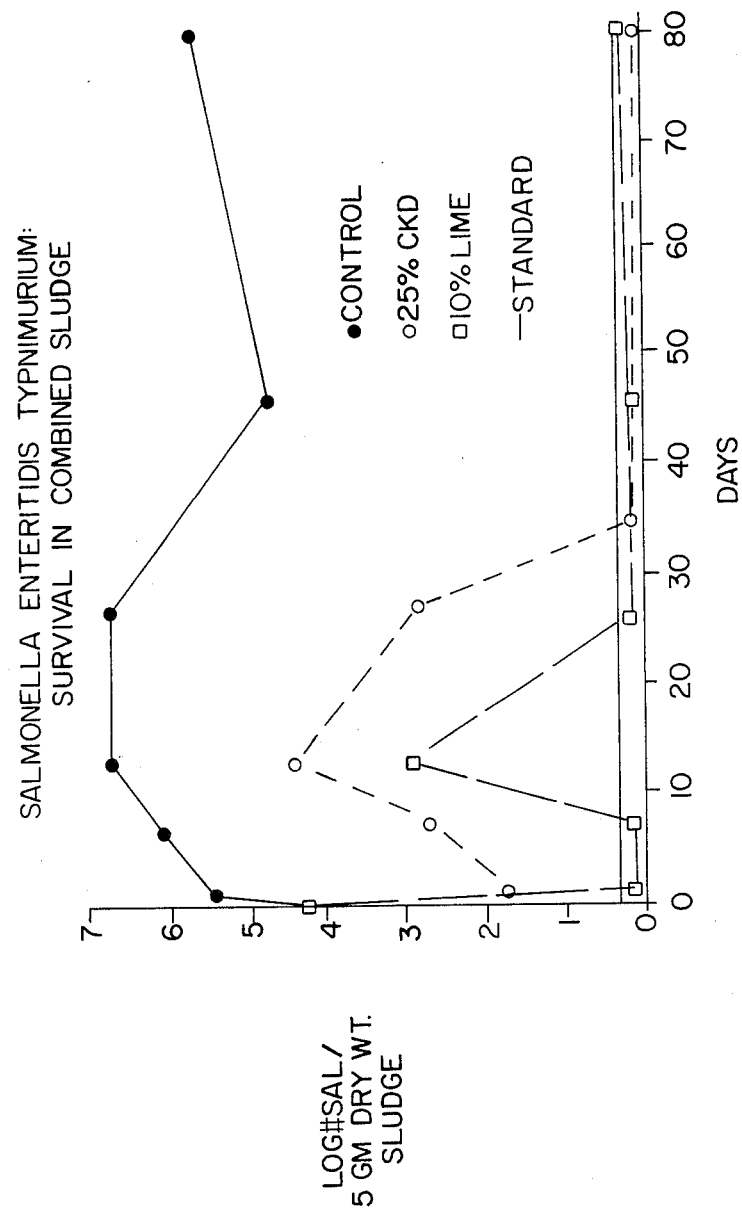
FIG. 5 are curves of the log number of *Salmonella enteritidis typhimurium* per weight of combined sludge versus days of treatment.

FIG. 5, comprises a curve of the log number of *Salmonella enteritidis typhimurium* per weight of combined sludge verses days of treatment, without any added materials, with twenty-five percent (25%) by weight cement kiln dust, and ten percent (10%) by weight lime.

Figure 6:
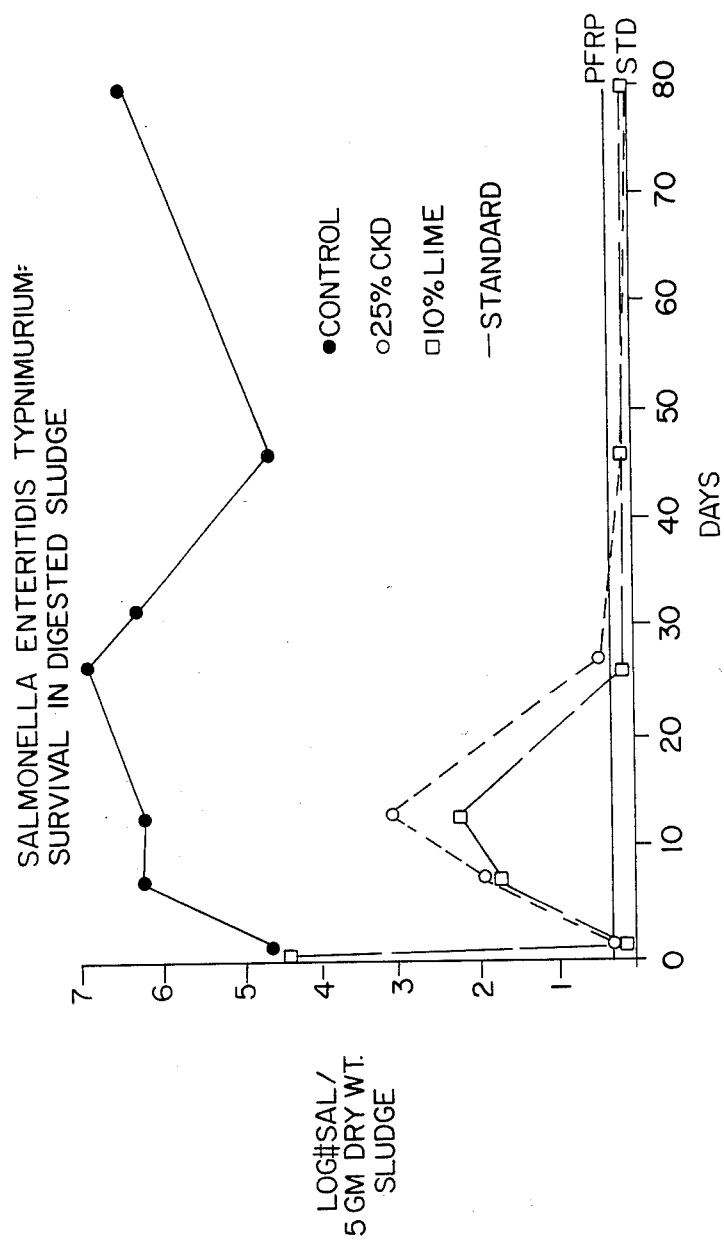
FIG. 6 are curves of the log number of *Salmonella enteritidis typhimurium* per weight of digested sludge versus days of treatment.

FIG. 6, comprises a curve of the log number of *Salmonella enteritidis typhimurium* per weight of digested sludge verses days of treatment, without any added materials, with twenty-five percent (25%) by weight cement kiln dust (CKD), and with ten percent (10%) by weight lime.

The principal bacterial indicator used by EPA in the setting of PFRP standards for agricultural use of sludge is the pathogen *Salmonella enteritidis typhimurium*. FIGS. 5 and 6 show that following an initial three to four (3-4) log decrease in one day, the Salmonella in all samples regrew to over 1000 Salmonella/5 gm dry weight sludge. Only after a combination of drying and pH exposure for over four (4) weeks did the Salmonella die off to levels associated with PFRP processes. The untreated or controlled Salmonella samples did not decrease over the eighty (80) days.

Figure 7:
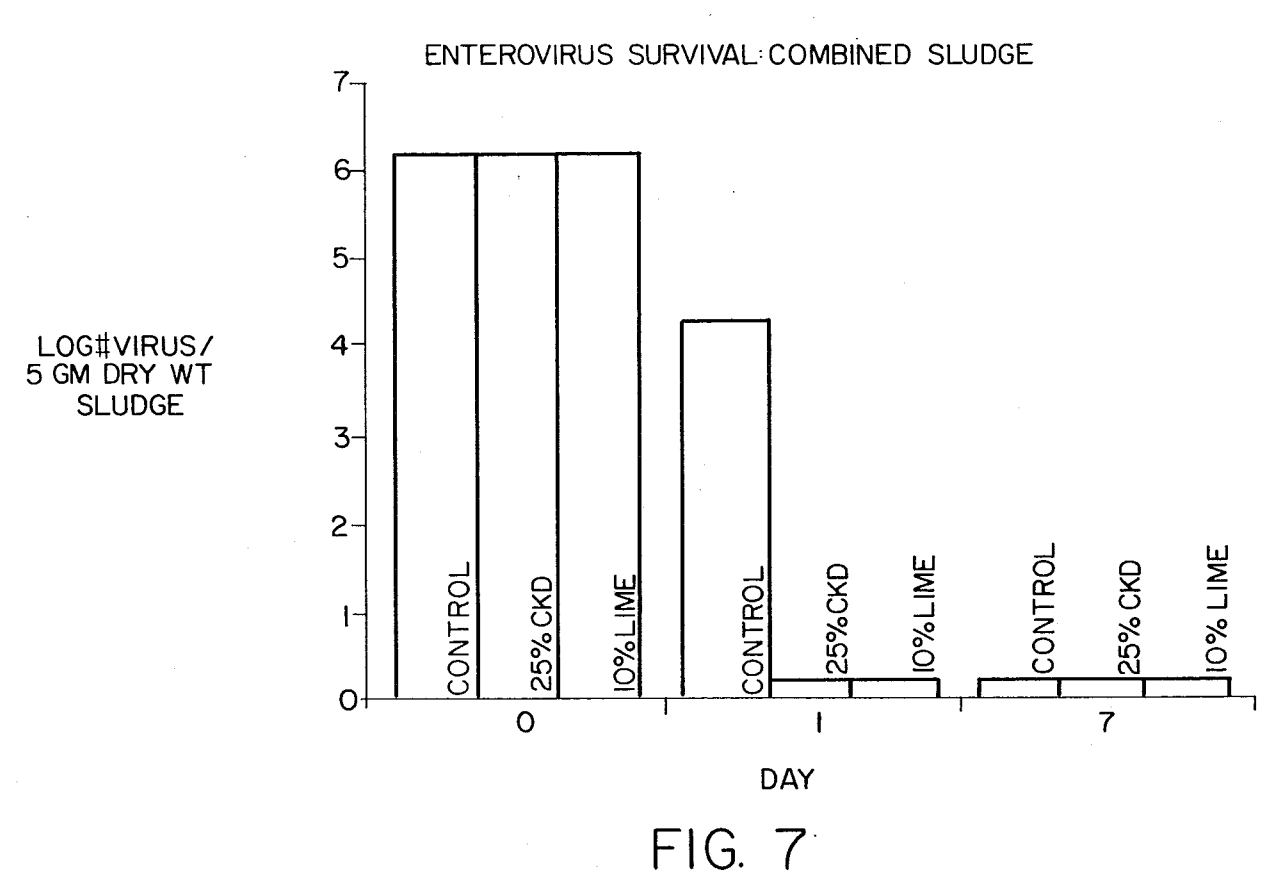

FIG. 7, comprises a bar chart of the log number of enterovirus per weight of combined sludge verses days of treatment, without any added materials, with twenty-five percent (25%) by weight cement kiln dust (CKD), and with ten percent (10%) by weight lime.

The enterovirus, Poliovirus type I, was measured for survival by assaying for viable virus on tissue culture lawns of Vero cells. The virus viability was decreased by cement kiln dust and lime treatment to levels associated with PFRP processes in one day, i.e. less than one viable virus per five (5) gm dry weight sludge as illustrated in FIG. 7. Virus levels in the untreated sludge sample decreased almost two (2) logs in one day and the entire population died in one (1) week.

Figure 8:
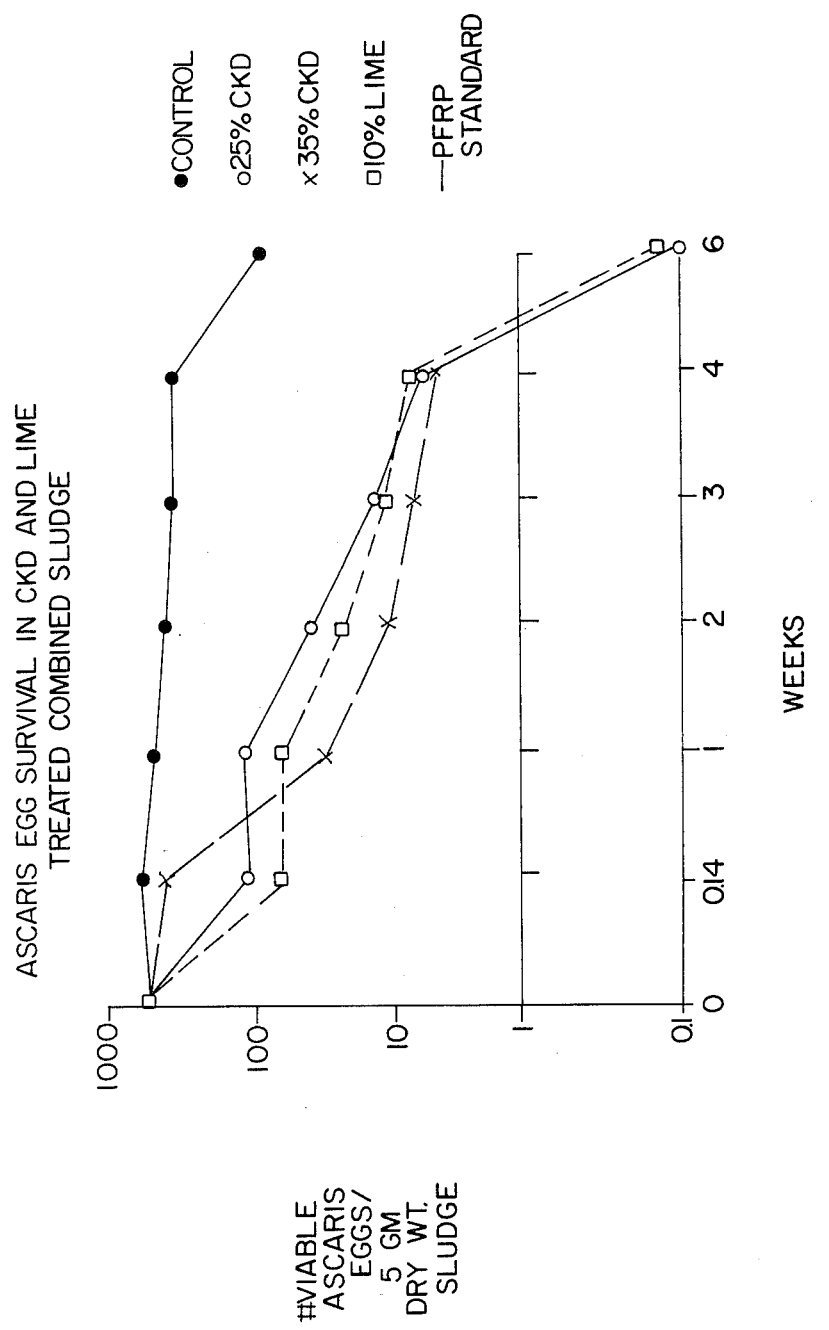
FIG. 8 are curves of the number of viable Ascaris eggs per weight of combined sludge versus weeks of treatment.

FIG. 8, comprises a curve of the number of viable Ascaris eggs per weight of combined sludge versus weeks of treatment, without any added materials, with twenty-five percent (25%) and thirty-five percent (35%) by weight cement kiln dust (CKD), and with ten percent (10%) by weight lime.

Figure 9:
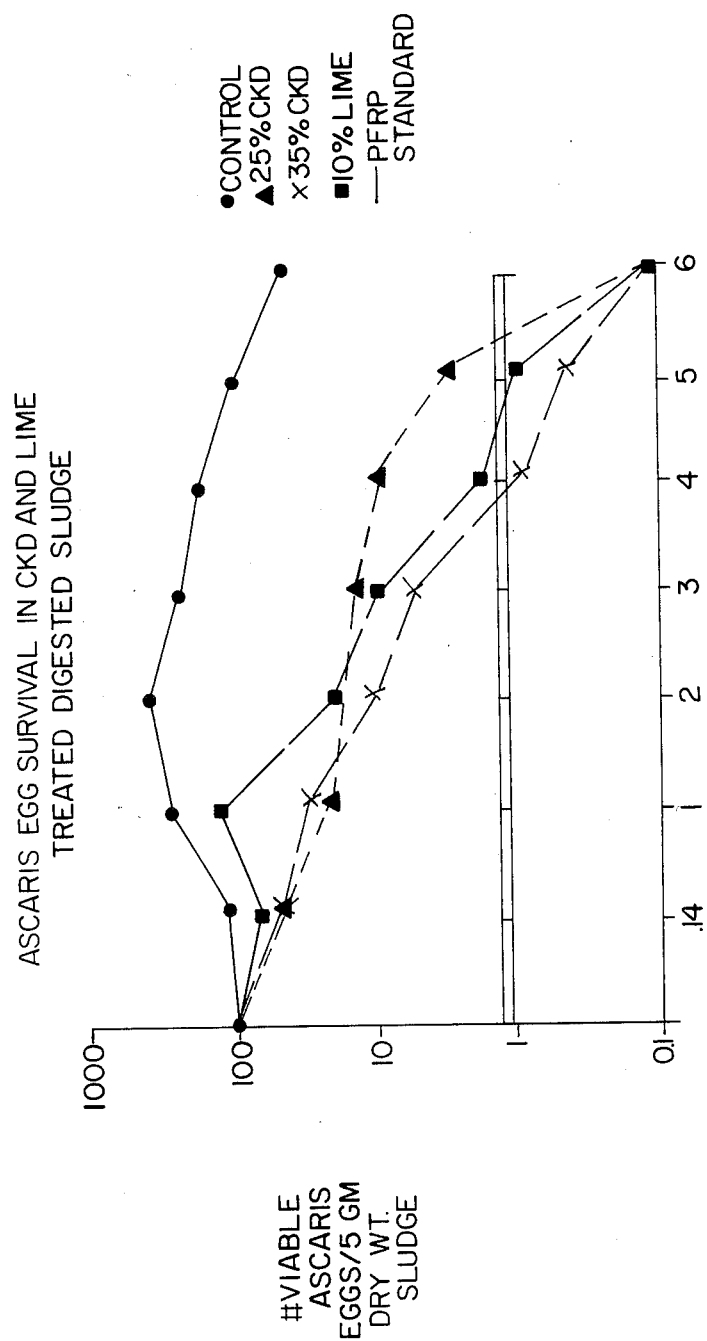
FIG. 9 are curves of the number of digested sludge versus weeks of treatment.

FIG. 9, comprises a curve of the number of viable Ascaris eggs per weight of digested sludge versus weeks of treatment, without any added materials, with twenty-five percent (25%) and thirty-five percent (35%) by weight cement kiln dust (CKD), and with ten percent (10%) by weight lime.

In other treatment processes for the stabilization of wastewater sludge the viability of the helminth ova has been the major difficulty encountered and certainly the most stringent of the EPA parameters to meet. The initial level of Ascaris eggs added to the sludge was 16000/5 gm dry weight sludge. Recovery following the procedure for measuring viability of these eggs ranged from about two percent (2%) in the digested sludge to about six percent (6%) in the combined sludge. The viability of these recovered eggs is shown in FIGS. 8 and 9 for combined and digested sludges respectively. The viability of these eggs decreased to PFRP required levels of one (1) viable eggs/5 gm dry weight sludge in the twenty-five percent (25%) and thirty-five percent (35%) by weight cement kiln dust and in the ten percent (10%) by weight lime treated combined and digested sludges only after six (6) weeks of incubation.

The reduction of pathogens that occurred in the sludge as a result of cement kiln dust or lime addition appears to be due to the samples initially achieving a pH of 11.5 followed by a synergistic interaction of elevated pH and drying. This proposition is supported by the following facts: (a) the samples without high pH but with significant drying did not experience a significant decline in microorganisms; (b) the samples such as the twenty-five percent (25%) by weight cement kiln dust treated combined sludge exhibited an initial high pH but a subsequent lower pH plateau and showed a killing of the Ascaris eggs continued at nearly logarithmic rates; (c) the longer the pH remained elevated above 9.5, as in the twenty-five percent (25%) by weight and thirty-five percent (35%) by weight cement kiln dust samples, the better the killing results with the Ascaris eggs; (d) as shown in the curve for the five percent (5%) by weight lime samples, higher pH by itself, without elevated drying, showed a delay in the killing of the Ascaris eggs.

FIG. 10, comprises a bar chart of the relative sludge odor after two weeks for digested and combined sludge, without any added materials, with fifteen percent (15%), twenty-five percent (25%), and thirty-five percent (35%) by weight cement kiln dust, and with five percent (5%) and ten percent (10%) by weight lime.

As illustrated by FIG. 10, the addition of cement kiln dust or lime did have an effect on the odor of the sludge. However, while all cement kiln dust and lime treatments improved the odor of the sludge, only the thirty-five percent (35%) by weight cement kiln dust treated sludge reduced the odor to a level that could be considered tolerable in a closed room.

It was also determined that the addition of cement kiln dust or lime to sludge had an effect on the material handling aspect of such sludge. The thirty-five percent (35%) by weight cement kiln dust treated sludge had an individual particle size averaging about two to five (2-5) mm in diameter and thus rendered the treated sludge easy to handle. In contrast, the lime treated and the fifteen percent (15%) and twenty-five percent (25%) by weight cement kiln dust treated samples all contained very large lumps averaging about three to eight (3-8) cm in diameter and rendered the treated sludge less easy to handle.

The following conclusions were reached regarding lime and kiln dust treated sludge processes:

1. Sludge treated with cement kiln dust or lime in all cases tested met PSRP classification requirements.
2. Cement kiln dust treated sludge enhanced the dyring rate of sludges particularly in the first four (4) weeks of treatment.
3. Cement kiln dust treated sludge loses its pH value more rapidly than lime treated sludge.
4. Bacterial pathogens such as Salmonella are controlled to PFRP levels by five (5) weeks when such sludges are treated with twenty-five percent (25%) and thirty-five percent (35%) by weight cement kiln dust or ten percent (10%) by weight lime.
5. Enterovirus levels were controlled to PFRP levels within one day by both cement kiln dust and lime treated sludges.
6. Ascaris egg survival was reduced by more than three (3) logs by higher dosage treatments within four (4) weeks. The twenty-five percent (25%) CKD, thirty-five percent (35%) CKD and ten percent (10%) by weight lime treated sludges have been shown to reach PFRP (1 viable egg/5 gm dry wt sludge) levels by day forty-six (46). The sample containing fifteen percent (15%) CKD in the combined sludge did not reach PFRP standards, while the sample with fifteen percent (15%) CKD in digested sludge did.
7. Both CKD and lime treatments reduce sludge odor. Only thirty-five percent (35%) CKD by weight treatment reduced odor to mild levels.
8. Drying was not sufficient by itself to kill microorganisms in sludge.
9. Regrowth of pathogens (Salmonella) was effectively prevented over the eighty (80) days of the study.
10. All EPA PFRP standards were reached after six (6) weeks of incubation of the twenty-five percent (25%) CKD, the thirty-five percent (35%) CKD and the ten percent (10%) lime by weight treated sludges.

With regard to the three PFRP standards the following results were achieved by six plus (6+) weeks (46 days):

| SLUDGE | TREAT-MENT | STANDARD Salmonella | Virus | Ascaris | All |
|---|---|---|---|---|---|
| COMBINED | Control | No | No | No | No |
| | 15% CKD | No | — | No | No |
| | 25% CKD | Yes (35) | Yes (1) | Yes (46) | Yes |
| | 35% CKD | Yes (27) | — | Yes (46) | Yes |
| | 5% Lime | Yes (46) | — | Yes (46) | ? |
| | 10% Lime | Yes (27) | Yes (1) | Yes (46) | Yes |
| DIGESTED | Control | No | No | No | No |
| | 15% CKD | Yes (46) | — | Yes (46) | ? |
| | 25% CKD | Yes (46) | — | Yes (46) | Yes* |
| | 35% CKD | Yes (27) | — | Yes (46) | Yes* |
| | 5% Lime | No | — | Yes (46) | No |
| | 10% Lime | Yes (27) | — | Yes (46) | Yes* |

Key:
No = PFRP not achieved
Yes = PFRP achieved
(3) = day that achievement was detected
? = results not completed
*conclusion based upon data with combined sludge Tests were conducted on the following 12 treatment groups:

| Combined | Digested |
|---|---|
| 1. Untreated | 7. Untreated |
| 2. 15% CKD | 8. 15% CKD |
| 3. 25% CKD | 9. 25% CKD |
| 4. 35% CKD | 10. 35% CKD |
| 5. 5% Lime | 11. 5% Lime |
| 6. 10% Lime | 12. 10% Lime |

Each of these treatment groups (5000 g sludge plus treatment) was contained in a 10 liter plastic tub. These were kept dry at 68 F. and were mixed twice weekly to facilitate drying. Samples were removed at 0, 1, 7, 13, 27, 46 and 80 days and processed to determine pathogen and microorganisms survival. The parameters that were determined at each sampling are listed as follows:

percent solids
pH
volume
fecal coliforms
fecal streptococci
Salmonella enteritidis typhimurium
Ascaris suum eggs
Human enteric virus (Polio Type I-vaccine strain)

The data from which the above referenced results and FIGS. 1-10 were compiled are summarized in the following tables.

TABLE I

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 6.8 | 92.7 | 76 | $1.7 \times 10^6$ | $6.5 \times 10^5$ | $7.5 \times 10^5$ | — | — |
| 2 | 15% CKD/COMB | 8.3 | 94.8 | — | $1.7 \times 10^5$ | $3.4 \times 10^7$ | 12.5 | — | — |
| 3 | 25% CKD/COMB | 8.9 | 95.2 | 57.2 | $5 \times 10^2$ | $3.4 \times 10^5$ | 0.4 | — | — |
| 4 | 35% CKD/COMB | 9.3 | 93.3 | — | $5 \times 10^2$ | $2.8 \times 10^2$ | 0.4 | — | — |
| 5 | 5% LIME/COMB | 8.4 | 91.2 | — | $5.5 \times 10^2$ | $3.5 \times 10^3$ | 2.9 | — | — |
| 6 | 10% LIME/COMB | 11.7 | 92.2 | 74.0 | $5 \times 10^2$ | $6.5 \times 10^0$ | 2.9 | — | — |
| 7 | DIGEST CONTROL | 6.3 | 92.4 | 74.0 | $4.7 \times 10^6$ | $2.4 \times 10^5$ | $3.5 \times 10^6$ | — | — |
| 8 | 15% CKD/DIG | 8.4 | 93.9 | | $6.5 \times 10^3$ | $1.1 \times 10^5$ | 0.4 | — | — |
| 9 | 25% CKD/DIG | 9.2 | 93.6 | 56.0 | $5 \times 10^2$ | $6.5 \times 10^2$ | 0.4 | — | — |
| 10 | 35% CKD/DIG | 9.6 | 92.4 | | $5 \times 10^2$ | $2.4 \times 10^1$ | 0.4 | — | — |
| 11 | 5% LIME/DIG | 8.6 | 92.4 | | $2.8 \times 10^2$ | $4.8 \times 10^1$ | 0.4 | — | — |

TABLE I-continued

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 12 | 10% LIME/DIG | 12.0 | 92.5 | 72.0 | 4.9 | $6.5 \times 10^1$ | 0.4 | — | — |

Dry weight sludge; FC = Fecal coliforms; FS = Fecal streptococci; Sal - *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = combined sludge treated with Lime; DIGEST CONTROL = Untreated digested sludge; CKD/DIG = digested sludge treated with cement kiln dust; LIME/DIG = Digested sludge treated with lime. - Elapsed Time 80 days

TABLE II

| Tub # | Treatment | ph | % Solids | Volume/ 100 gS | # FC/ 5 g DWS° | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 7.3 | 92.3 | 76.0 | $1.9 \times 10^6$ | $2.8 \times 10^8$ | $6.5 \times 10^4$ | — | 80.8 |
| 2 | 15% CKD/COMB | 8.4 | 94.7 | — | $1.0 \times 10^4$ | $1.5 \times 10^7$ | $4.9 \times 10^1$ | — | 2.8 |
| 3 | 25% CKD/COMB | 8.4 | 94.2 | 68.0 | $4.9 \times 10^0$ | $2.6 \times 10^4$ | .4 | — | 0 |
| 4 | 35% CKD/COMB | 10.1 | 91.9 | — | 0.4 | $6.5 \times 10^1$ | .4 | — | 0 |
| 5 | 5% LIME/COMB | 8.1 | 93.1 | — | $3.5 \times 10^2$ | $6.5 \times 10^4$ | .4 | — | 0 |
| 6 | 10% LIME/COMB | 12.5 | 89.7 | 82.0 | 6.7 | $1.1 \times 10^3$ | .4 | — | 0 |
| 7 | DIGESTED CONTROL | 6.5 | 93.6 | 76.0 | $3.4 \times 10^7$ | $6.5 \times 10^4$ | $5.5 \times 10^4$ | — | 37 |
| 8 | 15% CKD/DIG | 8.4 | 93.9 | — | $1.0 \times 10^5$ | $5 \times 10^5$ | .4 | — | 0.3 |
| 9 | 25% CKD/DIG | 8.2 | 95.2 | 62.0 | 4.9 | $1.1 \times 10^4$ | .4 | — | 0 |
| 10 | 35% CKD/DIG | 10.3 | 92.5 | — | 4.9 | $2.4 \times 10^2$ | .4 | — | 0 |
| 11 | 5% LIME/DIG | 8.1 | 92.9 | — | $3.5 \times 10^2$ | $3.7 \times 10^3$ | 3.65 | — | 0 |
| 12 | 10% LIME/DIG | 12.7 | 92.4 | 88.0 | 4.9 | $3.7 \times 10^3$ | .4 | — | 0 |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 46 days

TABLE III

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | | | | | | | | |
| 2 | | | | | | | | | |
| 3 | 25% CKD/COMB | | | | | | <0.5 | | |
| 4 | | | | | | | | | |
| 5 | 5% LIME/COMB | | | | | | 3.2 | | |
| 6 | | | | | | | | | |
| 7 | | | | | | | | | |
| 8 | | | | | | | | | |
| 9 | | | | | | | | | |
| 10 | | | | | | | | | |
| 11 | 5% LIME/DIG | | | | | | <0.5 | | |
| 12 | | | | | | | | | |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 35 days

TABLE IV

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 8.28 | 50.6 | 82.0 | $2.8 \times 10^6$ | $6.5 \times 10^8$ | $6.5 \times 10^6$ | — | 332 |
| 2 | 15% CKD/COMB | 8.2 | 94.4 | — | $1.9 \times 10^6$ | $3.4 \times 10^6$ | $.5 \times 10^1$ | — | 8.5 |
| 3 | 25% CKD/COMB | 8.6 | 91.7 | 71.2 | $3.7 \times 10^9$ | $1.1 \times 10^6$ | $8.5 \times 10^2$ | — | 5.8 |
| 4 | 35% CKD/COMB | 10.2 | 83.4 | — | $1.2 \times 10^1$ | $1.9 \times 10^3$ | <.5 | — | 1.9 |
| 5 | 5% LIME/COMB | 8.12 | 88.9 | — | $2.0 \times 10^2$ | $4.9 \times 10^3$ | — | 12.0 | |
| 6 | 10% LIME/COMB | 12.4 | 82.0 | 79.2 | 1.0 | $3.9 \times 10^3$ | <.5 | — | 6.5 |
| 7 | DIGEST CONTROL | 6.8 | 72.2 | 84.0 | $4.5 \times 10^6$ | $4.5 \times 10^8$ | $9.5 \times 10^6$ | — | 156.6 |
| 8 | 15% CKD/DIG | 8.4 | 94.9 | — | $4.7 \times 10^3$ | $4.9 \times 10^2$ | $1.1 \times 10^2$ | — | 19.7 |
| 9 | 25% CKD/DIG | 8.4 | 92.9 | 68.0 | 4.8 | $1.1 \times 10^4$ | 4.3 | — | 8.6 |
| 10 | 35% CKD/DIG | 10.4 | 82.1 | — | 3.2 | $2.2 \times 10^3$ | <0.5 | — | 0.8 |
| 11 | 5% LIME/DIG | 8.2 | 83.5 | — | 4.1 | $1.2 \times 10^4$ | $5.5 \times 10^2$ | — | 0.8 |
| 12 | 10% LIME/DIG | 12.4 | 80.1 | 74.0 | <.5 | $2.8 \times 10^3$ | <0.5 | — | 1.7 |

Dry weight sludge; FC = Fecal coliforms; FS = Fecal streptococci; Sal = *Salmonella enteritidis typhimurium*; #V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust;LIME/DIG = Digested sludge treated with lime. - Elapsed Time 27 days

TABLE V

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 8.9 | 41.6 | 86.4 | $2.4 \times 10^7$ | $4.4 \times 10^8$ | $>7.5 \times 10^6$ | — | 378 |
| 2 | 15% CKD/COMB | 8.3 | 74.7 | — | $6.0 \times 10^6$ | $1.4 \times 10^8$ | $>4.3 \times 10^5$ | — | 74.9 |
| 3 | 25% CKD/COMB | 10.0 | 75.1 | 68.8 | $3.5 \times 10^1$ | $1.4 \times 10^5$ | $>4.3 \times 10^4$ | — | 35.5 |

TABLE V-continued

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 4 | 35% CKD/COMB | 11.5 | 70.4 | — | $3.2 \times 10^2$ | $2.6 \times 10^2$ | $>7.0 \times 10^2$ | — | 9.4 |
| 5 | 5% LIME/COMB | 12.4 | 50.8 | — | $3.2 \times 10^4$ | $6.5 \times 10^4$ | $>9.5 \times 10^2$ | — | 55.7 |
| 6 | 10% LIME/COMB | 12.4 | 52.7 | 84 | 0.8 | $6.0 \times 10^3$ | $>9.0 \times 10^2$ | — | 20.3 |
| 7 | DIGEST CONTROL | 8.9 | 34.9 | 84 | $7 \times 10^7$ | $4.6 \times 10^7$ | $>1.2 \times 10^6$ | — | 351.9 |
| 8 | 15% CKD/DIG | 8.9 | 80.4 | — | $2 \times 10^3$ | $4.0 \times 10^5$ | $>8.5 \times 10^4$ | — | 63.0 |
| 9 | 25% CKD/DIG | 9.9 | 76.1 | 67.2 | 0.6 | $4.2 \times 10^4$ | $>1.1 \times 10^3$ | — | 17.6 |
| 10 | 35% CKD/DIG | 12.3 | 72.8 | — | 4.7 | $2.5 \times 10^3$ | $>1.1 \times 10^3$ | — | 9.2 |
| 11 | 5% LIME/DIG | 12.4 | 59.3 | — | 8 | $1.2 \times 10^4$ | $>2.0 \times 10^2$ | — | 80.7 |
| 12 | 10% CIME/DIG | 12.4 | 59.5 | 80.8 | 8 | $5.5 \times 10^3$ | $>2.0 \times 10^2$ | — | 15.7 |

Dry weight sludge; FC = Fecal coliforms; FS = Fecal streptococci; Sal = *Salmonella enteritidis typhimurium*; #V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 13 days

TABLE VI

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 8.8 | 29.9 | 88.0 | $5.5 \times 10^7$ | $1.3 \times 10^6$ | $1.3 \times 10^6$ | 0 | 445.6 |
| 2 | 15% CKD/COMB | 10.0 | 51.0 | — | $9.5 \times 10^5$ | $2.8 \times 10^7$ | $5.0 \times 10^4$ | — | 201.4 |
| 3 | 25% CKD/COMB | 11.3 | 54.4 | 70.0 | 0.6 | $5.0 \times 10^3$ | $7.5 \times 10^2$ | 0 | 107.8 |
| 4 | 35% CKD/COMB | 12.5 | 65.8 | | 0.5 | $7.5 \times 10^2$ | $3.3 \times 10^1$ | — | 27.8 |
| 5 | 5% LIME/COMB | 12.3 | 46.8 | | 0.7 | $8.5 \times 10^2$ | 0.7 | — | 96.3 |
| 6 | 10% LIME/COMB | 12.3 | 46.2 | 76.8 | 0.7 | $8.0 \times 10^0$ | 0.7 | 0 | 57.7 |
| 7 | DIGEST CONTROL | 8.6 | 36.1 | 87.2 | $4.1 \times 10^7$ | $2.3 \times 10^6$ | $1.1 \times 10^6$ | — | 243.7 |
| 8 | 15% CKD/DIG | 10.2 | 49.7 | | $6.5 \times 10^1$ | $1.0 \times 10^4$ | $>5.5 \times 10^2$ | — | 155.7 |
| 9 | 25% CKD/DIG | 11.2 | 51.9 | 70.0 | $1.3 \times 10^0$ | $7.5 \times 10^2$ | $7.5 \times 10^1$ | — | 16.2 |
| 10 | 35% CKD/DIG | 11.7 | 61.7 | | 0.5 | $4.3 \times 10^2$ | $6.0 \times 10^1$ | — | — |
| 11 | 5% LIME/DIG | 12.3 | 42.8 | | 0.8 | $6.0 \times 10^2$ | $9.0 \times 10^1$ | — | 130.5 |
| 12 | 10% LIME/DIG | 12.4 | 42.8 | 76.0 | 0.8 | $5.0 \times 10^2$ | $9.0 \times 10^1$ | — | 105.6 |

Dry weight sludge; FC = Fecal coliforms; FS = Fecal streptococci; Sal = *Salmonella enteritidis typhimurium*; #V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 7 days

TABLE VII

| Tub # | Treatment | ph | % Solids | Volume/ 100 gS | #FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 7.3 | 31.61 | 78.0 | $6.5 \times 10^8$ | $1.3 \times 10^7$ | $4.0 \times 10^5$ | $3.3 \times 10^4$ | 520.5 |
| 2 | 15% CKD/COMB | 11.7 | 44.9 | | $3.4 \times 10^6$ | $9.0 \times 10^6$ | $8.0 \times 10^4$ | — | 130.5 |
| 3 | 25% CKD/COMB | 12.7 | 51.3 | 80.0 | $1.2 \times 10^2$ | $1.5 \times 10^2$ | $7.0 \times 10^1$ | 0 | 99.6 |
| 4 | 35% CKD/COMB | 12.9 | 59.2 | | $5.5 \times 10^2$ | $1.7 \times 10^3$ | $6.0 \times 10^2$ | — | 448.5 |
| 5 | 5% LIME/COMB | 12.4 | 36.7 | | $2.1 \times 10^1$ | $1.1 \times 10^4$ | <1.2 | — | 54.4 |
| 6 | 10% LIME/COMB | 12.4 | 43.7 | 84.0 | $4.5 \times 10^0$ | $1.7 \times 10^2$ | <1.2 | 0 | 61.0 |
| 7 | DIGEST CONTROL | 7.6 | 34.8 | 90.0 | $2.2 \times 10^7$ | $2.2 \times 10^6$ | $6.5 \times 10^2$ | — | 99.3 |
| 8 | 15% CKD/DIG | 11.7 | 44.4 | | $2.8 \times 10^2$ | $1.4 \times 10^4$ | $1.3 \times 10^1$ | — | — |
| 9 | 25% CKD/DIG | 12.5 | 55.1 | 74.0 | $1.1 \times 10^2$ | $1.4 \times 10^3$ | <0.9 | — | 43.6 |
| 10 | 35% CKD/DIG | 13.0 | 60.5 | | $1.0 \times 10^1$ | $2.7 \times 10^3$ | <0.9 | — | 42.9 |
| 11 | 5% LIME/DIG | 12.2 | 38.2 | | $1.6 \times 10^1$ | $2.0 \times 10^3$ | <1.3 | — | — |
| 12 | 10% LIME/DIG | 12.4 | 46.1 | 82.0 | $1.3 \times 10^1$ | $1.3 \times 10^3$ | <1.1 | — | 58.6 |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 1 day

TABLE VIII

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 5.9 | 30.9 | 92.0 ml | $9.7 \times 10^6$ | $7.8 \times 10^5$ | $1.5 \times 10^4$ | $2.0 \times 10^6$ | $n_2 = 582.4$ |
| 2 | 15% CKD/COMB | 11.5 | 33.2 | — | $9.7 \times 10^6$ | $7.8 \times 10^5$ | $1.5 \times 10^4$ | — | — |
| 3 | 25% CKD/COMB | 12.5 | 42.9 | 76.0 ml | $9.7 \times 10^6$ | $7.8 \times 10^5$ | $1.5 \times 10^4$ | — | — |
| 4 | 35% CKD/COMB | 12.8 | 45.3 | — | $9.7 \times 10^6$ | $7.8 \times 10^5$ | $1.5 \times 10^4$ | — | — |
| 5 | 5% LIME/COMB | 12.3 | 49.4 | — | $9.7 \times 10^6$ | $7.8 \times 10^5$ | $1.5 \times 10^4$ | — | — |
| 6 | 10% LIME/COMB | 12.4 | 49.4 | 74.0 ml | $9.7 \times 10^6$ | $7.8 \times 10^5$ | $1.5 \times 10^4$ | — | — |
| 7 | DIGEST CONTROL | 7.0 | 34.6 | 88.0 ml | $1.8 \times 10^7$ | $4.1 \times 10^5$ | $5.2 \times 10^4$ | — | — |
| 8 | 15% CKD/DIG | 11.7 | 35.5 | — | $1.8 \times 10^7$ | $4.1 \times 10^5$ | $5.2 \times 10^4$ | — | — |
| 9 | 25% CKD/DIG | 12.4 | 37.0 | — | $1.8 \times 10^7$ | $4.1 \times 10^5$ | $5.2 \times 10^4$ | — | — |
| 10 | 35% CKD/DIG | 12.7 | 39.1 | — | $1.8 \times 10^7$ | $4.1 \times 10^5$ | $5.2 \times 10^4$ | — | — |
| 11 | 5% LIME/DIG | 12.4 | 40.2 | — | $1.8 \times 10^7$ | $4.1 \times 10^5$ | $5.2 \times 10^4$ | — | — |
| 12 | 10% LIME/DIG | 12.4 | 46.9 | — | $1.8 \times 10^7$ | $4.1 \times 10^5$ | $5.2 \times 10^4$ | — | — |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 0 days

I claim:

1. A method of treating biological sludge containing odor, animal viruses, pathogenic bacteria, and parasites to provide a fertilizer for agricultural lands which can be applied directly to the lands which consists essentially of the following steps:

mixing said sludge with at least one material selected from the group consisting of lime, cement kiln dust and lime kiln dust to form a mixture;

wherein the amount of added material mixed with said sludge being sufficient to raise the pH of said mixture to 12 and above for at least one day;

and drying said mixture to produce a granular material, the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacteria therein no less than three colony forming units per 100 ml of said sludge; to reduce parasites therein to less than one viable egg per 100 ml of said sludge; to reduce vector attraction to said sludge; and to prevent significant regrowth of the pathogenic microorganisms.

2. The method set forth in claim 1 wherein said amount of added material is sufficient to raise the pH of said mixture to 12 and above for at least seven days.

3. The method set forth in claim 1 wherein the added material comprises kiln dust and the amount of added material comprises about 35% by weight of the sludge to reduce the odor to a level that is tolerable in a closed room even though the pH may drop below 9 during the drying, and maintain that odor control indefinitely even though said mixture is exposed to climatic conditions.

4. The method set forth in claim 1 wherein the amount of added material mixed with said sludge and the length of time of drying is sufficient to reduce the odor to a level that is tolerable in a closed room even though the pH may drop below 9 during the drying, and maintain that odor control indefinitely even though said mixture is exposed to climatic conditions.

5. The method set forth in claim 1 wherein said drying is by aeration.

6. The method set forth in claim 1 wherein said drying is continued until the major portion, by weight, of the product comprises solids.

7. The method set forth in claim 1 wherein said drying is by aeration and by the addition of heat in an amount, which is insufficient to sterilize, such that the length of drying time is significantly reduced.

8. The method set forth in claim 7 wherein said heat is added by chemically generated heat or direct heat.

9. The method set forth in claim 7 wherein said heat is provided by adding heat generating materials to the mixture of sludge and added material.

* * * * *

US004781842C1

(12) REEXAMINATION CERTIFICATE (4811th)
United States Patent
Nicholson

(10) Number: US 4,781,842 C1
(45) Certificate Issued: Jul. 15, 2003

(54) METHOD OF TREATING WASTEWATER SLUDGE

(75) Inventor: John P. Nicholson, Toledo, OH (US)

(73) Assignee: N-Viro International Corporation, Toledo, OH (US)

Reexamination Request:
No. 90/006,263, Apr. 8, 2002

Reexamination Certificate for:
Patent No.: 4,781,842
Issued: Nov. 1, 1988
Appl. No.: 07/019,888
Filed: Feb. 27, 1987

(51) Int. Cl.$^7$ ................................................ C02F 11/14
(52) U.S. Cl. .................. 405/129.25; 210/916; 210/764; 210/751; 71/13
(58) Field of Search ........................ 408/129.25, 129.27, 408/129.2; 210/764, 766, 916; 71/13

(56) References Cited

U.S. PATENT DOCUMENTS

| | | | |
|---|---|---|---|
| 3,476,683 A | 11/1969 | Liljegren | 210/8 |
| 4,079,003 A | 3/1978 | Manchak | 210/46 |
| 4,306,978 A | 12/1981 | Wurtz | 210/750 |
| 4,554,002 A | 11/1985 | Nicholson | 71/12 |

FOREIGN PATENT DOCUMENTS

| | | | |
|---|---|---|---|
| DE | 25 23 628 | 12/1976 | C05D/3/00 |
| DE | 28 00 915 | 1/1978 | |

OTHER PUBLICATIONS

Complaint, N–Viro International Corp. v. The City of Warren, Ohio, No. 4:00CV531 (N.D. Ohio), Feb. 25, 2000.
Answer and Counterclaims, N–Viro International Corp. v. The City of Warren, Ohio, No. 4:00CV531 (N.D. Ohio), Apr. 17, 2000.
Reply to Counterclaims, N–Viro International Corp. v. The City of Warren, Ohio, No. 4:00CV531 (N.D. Ohio), May 8, 2000.
Stipulation of Dismissal, N–Viro International Corp. v. The City of Warren, Ohio, No. 4:00CV531 (N.D. Ohio), Sep. 14, 2000.
Amended Complaint, RDP Technologies, Inc v. N–Viro International Corp., No. 00–697–RRM (D. Del.), Oct. 13, 2000.
Answer to Amended Complaint, RDP Technologies, Inc. v. N–Viro International Corp., No. 00–697–RRM (D. Del.), Jan. 5, 2001.
Joint Pretrial Order, RDP Technologies, Inc. v. N–Viro International Corp., No. 00–697–RRM (D. Del), Oct. 19, 2001 (including Exhibits 1–6 and 11–14).
Expert Report of Joseph B. Farrell, RDP Technologies, Inc. v. N–Viro International Corp., No. 00–679–RRM (D. Del.), Jun. 1, 2001 (pertinent references listed separately).
Rebuttal Expert Report of Robert S. Reimers, PH.D., RDP Technologies, Inc. v. N–Viro International Corp., No. 00–697–RRM (D. Del.), Jul. 26, 2001 (pertinent references listed separately).
Consent Judgment, RDP Technologies, Inc. v. N–Viro International Corp., No. 00–697–RRM (D. Del.), Oct. 31, 2001.
R.S. Reimers et al., "Persistence of Pathogens in Lagoon–Stored Sludge," EPA 600/2–89/015, Apr. 1989.
T. Kovacik, "Successful Recycling for Sludge and Solid Waste," presented to the BioCycle Southeast Conference '87, Nov. 5, 1987.
D. Angelbeck et al., "A New, Innovative Sludge Stabilization/Management Process: Cement Kiln Dust (CKD) Alkaline Stabilization Compared to Anaerobic Digestion—An Economic Analysis," presented to the 16th Annual Conference of the Water Pollution Control Federation, Oct. 5, 1987.

(List continued on next page.)

Primary Examiner—Betsey Morrison Hoey

(57) ABSTRACT

A method of decontaminating wastewater sludge to a level that meets or exceeds USEPA Process to Further Reduce Pathogens standards, wherein lime or kiln dust and/or other alkaline meterials are mixed with waste water sludge in sufficient quantity to raise the pH of the mixture to 12 and above for at least two hours and drying the resulting mixture by an aeration process.

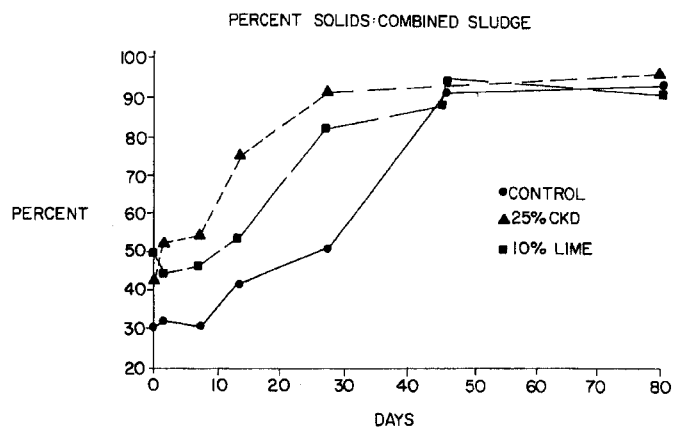

OTHER PUBLICATIONS

"Design Manual: Dewatering Municipal Wastewater Sludges," EPA 625/1–87/014, Sep. 1987.

"Toledo Puts Its Sludge Out to Pasture," Chemical Week, Sep. 2, 1987.

"'N–Viro's Treatment of Sludge with Kiln Dust Most Economical Method' According to Professional," Sylvania Herald, Aug. 5, 1987.

"Alkaline Treatment and Utilization of Municipal Wastewater Sludges," presented to the Water Pollution Control Dept. of the U.S. EPA by the Nat'l Kiln Dust Management Association and the Nat'l Lime Association, Mar. 25, 1987.

News Release by Medical College of Ohio, "Thomas Edison Grant Award," Dec. 22, 1986.

J. Burnham, "The Effect of Cement Kiln Dust and Lime on Microorganism Survival in Toledo Municipal Waste Water Sludges," Nov. 26, 1986.

J. Burnham, "The Effect of Cement Kiln Dust and Lime on Microorganism Survival in Toledo Municipal Waste Water Sludges," Nov. 1, 1986.

News Release by City of Toledo, Ohio Dept. of Public Utilities, Oct. 6, 1986.

L. Ruggiano, "Innovative Sludge Management: Imagination and Technology Go a Long Way to Solve a City's Sludge Problem," Water Pollution Control Association of Pennsylvania Magazine, May–Jun. 1986, 42–43.

R.S. Reimers et al., "Project Summary: Investigation of Parasities in Sludges and Disinfection Techniques," EPA 600/S1–85/022, Jan. 1986.

R.S. Reimers et al., "Investigation of Parasities in Sludges and Disinfection Techniques," EPA 600/1–85/022, Nov. 1985.

W. Whittington, Memo. re "Application of 40 CFR Part 257 Regulations to Pathogen Reduction Preceding Land Application Sewage Sludge or Septic Tank Pumpings," U.S. EPA, Nov. 6, 1985.

"Sludge Stabilization and Conditioning at the Toledo Wastewater Treatment Plant," presented to the 6th Annual International Conference on Economic and Environmental Utilization of Kiln Dust/Fly Ash Technology, Feb. 20, 1985.

T. Marcinkowski, "Decontamination of Sewage Sludges with Quicklime," Waste Management & Research, 55–64, 1985.

"Mixer Saves Sludge Costs," Utah Waterline, Sep. 12, 1984.

M. Iacoboni et al., "Project Summary: Windrow and Static Pile Composting of Municipal Sewage Sludges," EPA 600/S2–84–122, Sep. 1984.

"Use and Disposal of Municipal Wastewater Sludge," EPA 625/10–84–003, Sep. 1984.

J. Montgomery, "Technology Evaluation of Brown Bear™ Tractor for Sludge DeWatering," Sep. 1984.

R. Ward et al., "Pathogens in Sludge: Occurrence, Inactivation, and Potential for Regrowth," Sandia National Labs. Publ. No. SAND 83–0557, Jul. 1984.

R.S. Reimers et al., "Parasites in Southern Sludges and Disinfection by Standard Sludge Treatment," EPA 600/2–81–166, Sep. 1981.

R. Otoski, "Project Summary: Lime Stabilization and Ultimate Disposal of Municipal Wastewater Sludges," EPA 600/S2–81–076, Jun. 1981.

Camp, Dresser, and McKee, Inc., "Lime Stabilization and Ultimate Disposal of Municipal Wastewater Sludges," EPA 600/2–81–076, May 1981.

G. Earnshaw, "Best of Both (Composting) World," Sludge, May–Jun. 1980, 15–19.

Criteria for Classification of Solid Waste Disposal Facilities and Practices, 44 Fed. Reg. 53460–53464, Sep. 13, 1979 (codified at 40 C.F.R § 257).

"Process Design Manual for Sludge Treatment and Disposal," EPA 625/1–79–011, Sep. 1979. pp 6.100–6.114, 7.1–7.47, 12.1–12.61.

L. Andersson, "Lime Treatment of Sewage Sludge," Sep. 22, 1978.

R.F. Noland et al., "Full Scale Demonstration of Lime Stabilization," EPA 600/2–78–171, Sep. 1978.

J.P. Brannen et al., "Inactivation of Ascaris Lumbricoides Eggs by Heat, Radiation, and Thermoradiation," Sandia National Labs. Publ. No. SAND 75–0163, Jul. 1975.

C. Counts and A. Shuckrow, "Lime Stabilized Sludge: Its Stability and Effect on Agricultural Land," EPA 670/2–75–012, Apr. 1975.

"Municipal Sludge Management," Proceedings of the Nat'l Conference on Municipal Sludge Management, Jun. 11–13, 1974.

J.B. Farrell et al., "Lime Stabilization of Primary Sludges," J. Wat. Poll. Contr. Fed., No. 1, 113–122, Jan. 1974.

E. Cram, "The Effect of Sludge Digestion, Drying and Supplemental Treatment on Eggs of *Ascaris lumbricoides*," Proceedings of the Helminthological Society of Washington, vol. 11, No. 1, Jan. 1944.

"Developments in Dewatering," BioCycle, 28 (undated).

Chicago Drying Cells and St. Paul Compost, BioCycle, 38 (undated).

Product Application Reviews for Brown Bear auger tractor, Brown Bear Corp. (undated).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 54–62:

In accordance with the invention, lime, cement kiln dust or lime kiln dust or mixtures thereof and/or other alkaline materials are mixed with wastewater sludge in sufficient quantity to raise the pH to 12 and above for at least two hours and the resulting mixture is *actively* dried by an aeration process. The process produces a product wherein the pathogen viability has been reduced to a level that meets or exceeds USEPA criteria for PFRP processes *without eliminating all of the beneficial non-pathogenic microorganisms*.

Column 5, lines 22–46:

Basically, the process of this invention comprises mechanically dewatering the sludge; chemical stabilizing of the wastewater sludge with quantities of lime, cement kiln dust or lime kiln dust or mixtures thereof sufficient to maintain a pH of 12 and above for at least two hours and preferably for days; and then *actively* drying the sludge by an aeration process such as a Brown Bear aerating device. To achieve PFRP pathogen reduction criteria, the treated sludge is [aerated] *dried* such that the sludge is at least eighty percent (80%) by weight solids and preferably ninety percent (90%) by weight solids. The product is allowed to air cure for about 10 days after *the* desired solids content is achieved. The drying and curing of the mixture may also be accomplished by a windrow method, turn-over method, or other forced air methods. The curing time or aeration time is dependent on the type of storage facility ([cover] *covered*, enclosed, or open), aeration procedure, mix design, physical and chemical properties of the admixtures, quality of the mixing facilities, percent solids of dewatering cake, and type of sludge. The chemical stabilizing admixture can be added after mechanical dewatering, if desired. Lime, cement kiln dust and lime kiln dust are excellent flocculents and thus can be useful in conditioning prior to mechanical dewatering with most equipment.

Column 5, lines 51–62:

The addition of high reactant-heat generating materials or heating the sludge and materials may be used to reduce the total amount of admixture required and/or *to* reduce the *drying and/or* curing time required. Addition of anhydrous ammonia and either phosphoric acid or sulphuric acid to chemical stabilized sludge, having a pH of 12 and above, produces sufficient heat to help reduce pathogens to a level equivalent to PFRP processes and at the same time increases the nutritional value of the sludge while reducing curing time and [natural] *active* drying requirements. In addition to chemical generated heat, mechanical or electrical heat may be applied to dry and cure the mixture.

AS A RESULT OF REEXAMINATION, IT HAS BEEN DETERMINED THAT:

Claim 1 is determined to be patentable as amended.

Claims 2–9, dependent on an amended claim, are determined to be patentable.

1. A method of treating biological sludge containing odor, animal viruses, pathogenic bacteria, and parasites to provide a fertilizer for agricultural lands which can be applied directly to the lands which consists essentially of the following steps:

mixing said sludge with at least one material selected from the group consisting of lime, cement kiln dust and lime kiln dust to form a mixture[; wherein], the amount of added material mixed with said sludge being sufficient to raise the pH of said mixture to 12 and above for at least one day; and

*actively* drying said mixture to produce a granular material, the amount of added material mixed with said sludge and the length of time of drying being suffcient to reduce significantly offensive odor of the sludge to a level that is tolerable[;], to reduce animal viruses therein to less than one plaque forming unit per 100 ml of said sludge[;], to reduce pathogenic bacteria therein [no] *to* less than three colony forming units per 100 ml of said sludge[;], to reduce parasites therein to less than one viable egg per 100 ml of said sludge[;], to reduce vector attraction to said sludge[;] and to prevent significant regrowth of the pathogenic microorganisms *such that levels of Salmonella remain below three colony forming units per 100 ml of said sludge 80 days after mixing said sludge with said added material, while being insufficient to eliminate all beneficial non-pathogenic microorganisms from the sludge*.

* * * * *